(12) United States Patent
Linares et al.

(10) Patent No.: US 7,682,141 B2
(45) Date of Patent: Mar. 23, 2010

(54) PRODUCTION APPARATUS FOR FORMING PLASTIC MOLDED ARTICLES

(75) Inventors: Miguel A. Linares, Bloomfield Hills, MI (US); Panfilo M. Dinello, Clinton Township, MI (US)

(73) Assignee: 3DM Worldwide PLC, Mt. Clemens, MI (US)

( * ) Notice: Subject to any disclaimer, the term of this patent is extended or adjusted under 35 U.S.C. 154(b) by 1241 days.

(21) Appl. No.: 10/530,258

(22) PCT Filed: Sep. 30, 2003

(86) PCT No.: PCT/US03/30843

§ 371 (c)(1),
(2), (4) Date: Mar. 30, 2005

(87) PCT Pub. No.: WO2004/030888

PCT Pub. Date: Apr. 15, 2004

(65) Prior Publication Data

US 2006/0131773 A1 Jun. 22, 2006

Related U.S. Application Data

(60) Provisional application No. 60/414,969, filed on Sep. 30, 2002.

(51) Int. Cl.
*B29C 44/06* (2006.01)
(52) U.S. Cl. ............... 425/4 R; 425/81.1; 425/384; 425/435
(58) Field of Classification Search ............ 425/4 R, 425/4 C, 80.1–83.1, 215, 217, 384, 409, 403, 425/435, 457
See application file for complete search history.

(56) References Cited

U.S. PATENT DOCUMENTS

| | | | | |
|---|---|---|---|---|
| 3,971,163 | A * | 7/1976 | Trombley et al. | 451/163 |
| 4,124,905 | A * | 11/1978 | Clark | 623/6.12 |
| 4,267,142 | A * | 5/1981 | Lankheet | 425/338 |
| 4,664,864 | A | 5/1987 | Wersosky | |
| 4,722,678 | A | 2/1988 | Wersosky | |
| 4,842,782 | A * | 6/1989 | Portney et al. | 264/1.37 |
| 4,898,697 | A | 2/1990 | Horton | |
| 5,056,998 | A * | 10/1991 | Goossens | 425/406 |
| 5,275,623 | A * | 1/1994 | Sarfarazi | 623/6.13 |
| 5,762,837 | A * | 6/1998 | Grisoni et al. | 264/2.1 |
| 6,488,708 | B2 * | 12/2002 | Sarfarazi | 623/6.34 |

(Continued)

FOREIGN PATENT DOCUMENTS

EP 1228156 B1 8/2002

(Continued)

*Primary Examiner*—Yogendra Gupta
*Assistant Examiner*—Thu Khanh T Nguyen
(74) *Attorney, Agent, or Firm*—Lynn E. Cargill; Cargill & Associates, PLLC

(57) ABSTRACT

An apparatus and method for making plastic molded articles generally having a double-skinned configuration with a foamed interior extending between the two skins. Such an article can be produced with a double beauty finish, and various inserts can be placed within the foamed interior between the two skins. The apparatus of the present invention includes the machinery used in order to make such a plastic article. The heated mold configurations can be made of inexpensive aluminum, compared to the traditional stainless steel production mold, and therefore will help the manufacture of large molded plastic articles.

8 Claims, 7 Drawing Sheets

U.S. PATENT DOCUMENTS

| | | | |
|---|---|---|---|
| 6,558,592 B1 * | 5/2003 | Nohara et al. | 425/4 R |
| 6,589,470 B2 * | 7/2003 | Fried et al. | 425/384 |
| 2001/0020757 A1 | 9/2001 | Fried et al. | |
| 2003/0018384 A1 * | 1/2003 | Valyunin et al. | 623/6.34 |
| 2003/0208267 A1 * | 11/2003 | Buzard | 623/6.36 |

FOREIGN PATENT DOCUMENTS

| | | |
|---|---|---|
| JP | 57074127 A | 5/1982 |
| JP | 02220819 A | 9/1990 |

\* cited by examiner

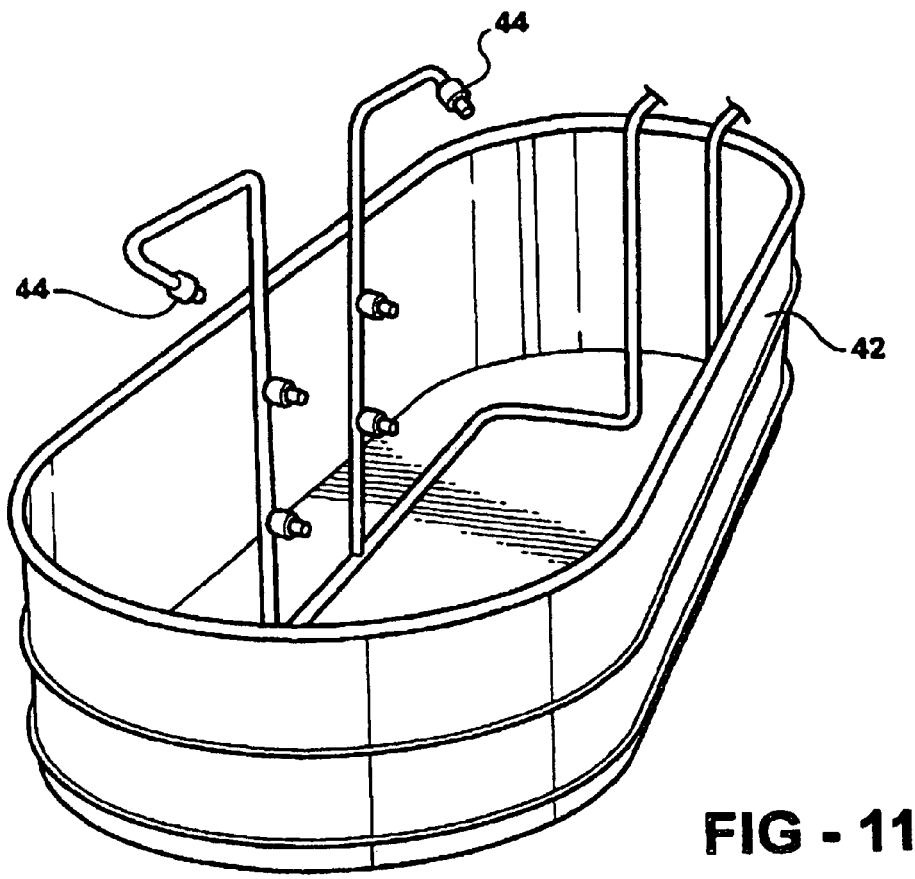
FIG - 11
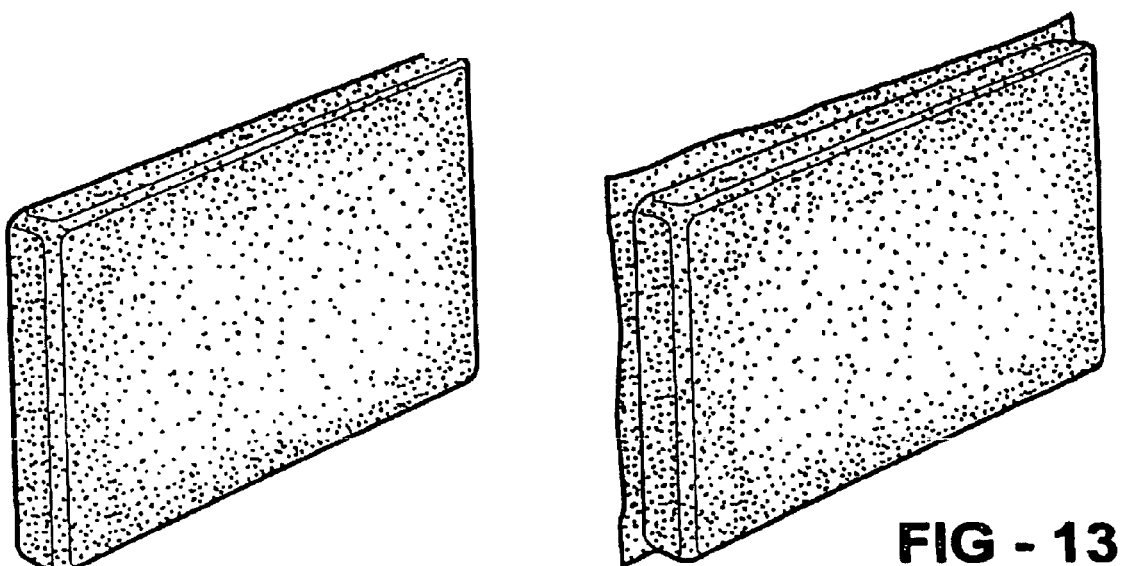
FIG - 12
FIG - 13

PRODUCTION APPARATUS FOR FORMING PLASTIC MOLDED ARTICLES

CROSS REFERENCES TO RELATED APPLICATIONS

This application claims the benefit of U.S. Provisional Application No. 60/414,969 filed on Sept. 30, 2002.

TECHNICAL FIELD

This invention relates to methods and apparati for molding plastic articles, and more particularly relates to a method and apparatus for molding plastic into articles from particulate plastic material.

BACKGROUND OF THE INVENTION

Since the introduction of plastics in the 1940's after World War II, engineers have been utilizing plastic to make any number of different articles. The plastic industry started with an injection molding machine and method, and has since been advanced into blow-molding, roto-molding, compression-molding, and other means of making plastic articles. Making a mold for an injection molding machine, which is the most common form of forming plastic, is basically a series of steps which include the manufacture of an aluminum or Kirksite mold in order to produce proto-type plastic parts. These molds generally can produce a number of plastic articles on the order of from approximately 100 parts to about 2 to 3 thousands parts, depending on what the tolerances are for the molded articles themselves. If the molded articles have a lot of sharp corners and high tolerance components, the aluminum or Kirksite mold will quickly degrade in quality and maintain its tolerances due to the fact that high pressure is utilized to force melted plastic particles into the mold with such pressure that it will force the plastic into all the nooks and crannies of the mold, thereby forming a complex part. As injection molding is the most common of the plastic forming techniques, it is well known to be the least expensive means for forming large numbers of such plastic articles.

Although injection molding is the least expensive process, this is only the case if the plastic articles being formed are being made in large volumes. The cost of the injection mold must be amortized over the cost of all of the plastic parts. For instance, if a mold costs $150,000 U.S. dollars, and it is planned to form 600,000 parts, then $150,000 or one-quarter, of the costs of each of the 600,000 parts must be attributed to the cost of the mold. Therefore, it has always been an expensive proposition to run a small number of plastic parts with an expensive injection mold. The cost of the mold may raise the cost of the plastic parts to a point where it is not feasible.

Other methods of forming plastic have their advantages and disadvantages as well. Some of them do not produce parts that have smooth surfaces on both sides, some of them produce articles utilizing even more expensive materials and producing parts that will not crack and stress, while other methods may produce one-sided articles, which may or may not be suitable for certain production items.

Previous methods have formed plastic articles that have modulus strengths which are limited by the modulus strengths of the plastic itself. A steel article has a modulus strength on the order of a 30 modulus. Other materials have modulus strengths generally therebetween. Prior art methods have not been known to strengthen the modulus strength of certain plastic articles, with the exception of the inclusion of various chopped fibers and the like. In addition, load bearing structural elements have been produced for large, self-supporting panels having a high weight to strength ratio for bridge components, airplane decks, and the like. These components have formed roof panels and the like although there are certain drawbacks which prevent it from being used in the automotive or aircraft industries. These components, however, generally have been produced with a poor surface finish, and will not provide the type of detail which may be necessary for many applications.

In addition, prior art methods have been utilized to incorporate a "sandwiched" form, including a foamed polyurethane core, which may be in the form of a foam sponge, or it may be a foamed core which produces gaseous substances during the curing, in order to increase the volume of the foamed core. Certain reinforcing fibers may also be incorporated in an attempt to increase the strength of the plastic.

By way of explanation of various other methods and embodiments of the method and resulting articles, we are hereby also incorporating by reference the U.S. Provisional Patent Applications No. 60/270,321 filed on Feb. 5, 2001; No. 60/300,874 filed on Jun. 25, 2001; No. 60/346,336 filed on Jan. 7, 2002; and International Application No. PCT/US02/03298 filed on Feb. 5, 2002.

Therefore, it would be a great advantage to the industry if a new method and apparatus could be promoted for inexpensively manufacturing large, strong plastic articles. It would be an even greater advantage if the molds were so inexpensive that small production numbers could become economically feasible.

SUMMARY OF THE INVENTION

In accordance with the above noted advantages and desires of the industry, the present invention provides a production line method and apparatus for forming plastic molded articles utilizing heated molds and particulate thermal plastic materials having a melting point which allows the particulate materials to melt and form skins on the heated molds. Further disclosed is a method of making articles with the production method utilizing the production line apparatus, in order to make plastic articles with a double-skinned and generally including a foamed center in certain embodiments.

One specific preferred embodiment includes the use of complementary heated molds which are first filled with a first powdered plastic material in order to form a melted skin thereon, followed by inserting a foamable plastic between the complementary molds, and the heat from the heated molds being utilized to kick off the foam and allow it to expand into the cavity between the two skins. Thereafter, the molds are cooled, and the part is released. In this one specific embodiment, the initial skinned molds are tipped upside down In order to release any unmelted plastic materials into a receptacle thereunder.

In another aspect of the specific embodiment, there is a rolling cart utilizing the molds in a tipping arrangement such that the rolling cart may be rolled from underneath a distribution system for the surface plastic powder materials, which can then be moved underneath a distribution system for the foam powder plastics.

Therefore, the invention is particularly useful for applications of making very large plastic articles, while maintaining an inexpensive mold for use in the process. The preferred embodiment of the mold includes the use of CNC routed aluminum molds, which can be used many times over in a production setting. Needless to say, the use of the aluminum mold is much less expensive for production than a stainless steel mold which is commonly used in the industry for injection molded processes. There has long been a need for an inexpensive mold which could be used for the production of very large plastic articles. By way of contrast, stainless steel molds suitable for production of injection molded parts are generally extremely expensive, on the order of millions of dollars for large articles such as pick-up truck boxes, boat hulls, sewer pipes and the like. On the other hand, in the instance of a pick-up truck box bed, the present invention includes the use of a mold which would cost on the order of several hundred thousand dollars, rather than several millions of dollars for a stainless steel injection molding production mold.

Although the invention will be described by way of examples hereinbelow for specific embodiments having certain features, it must also be realized that minor modifications that do not require undo experimentation on the part of the practitioner are covered within the scope and breadth of this invention. Additional advantages and other novel features of the present invention will be set forth in the description that follows and in particular will be apparent to those skilled in the art upon examination or may be learned within the practice of the invention. Therefore, the invention is capable of many other different embodiments and its details are capable of modifications of various aspects which will be obvious to those of ordinary skill in the art all without departing from the spirit of the present invention. Accordingly, the rest of the description will be regarded as illustrative rather than restrictive.

BRIEF DESCRIPTION OF THE DRAWINGS

For a further understanding of the nature and advantages of the expected scope and various embodiments of the present invention, reference shall be made to the following detailed description, and when taken in conjunction with the accompanying drawings, in which like parts are given the same reference numerals, and wherein:

FIG. 11 is a detailed illustration of one embodiment of the cooling station;

FIG. 12 is a front elevational view of a resulting plastic article; and

FIG. 13 is a front elevational view of a resulting plastic article made with the use of the clamping mechanism.

DETAILED DESCRIPTION OF THE INVENTION

Figure 1:
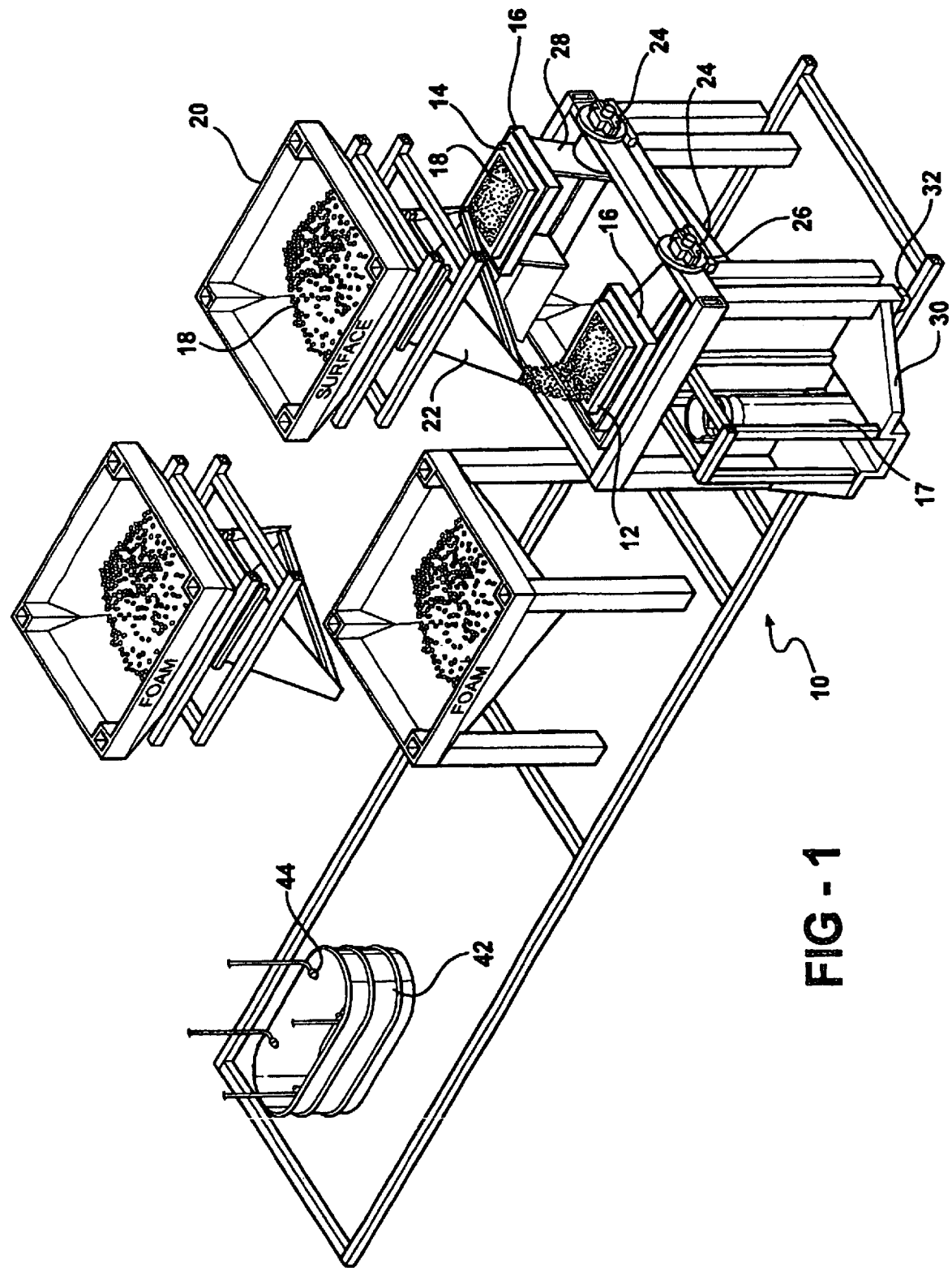
FIG. 1 is a front perspective view of a powder mold plastic article making apparatus made in accordance with the present invention showing a rolling cart for holding mold sections in position under a plastic particulate distributor.

In accordance with the objects and advantages being sought hereinabove, the present invention discloses a production line method and apparatus for forming plastic molded articles utilizing heated molds and particulate thermoplastic materials. The present method will yield a double-skinned, foamed center plastic article, which may or may not include various reinforcements within the foamed layer to add strength or other functionalities. In that regard, there is shown a schematic view of the apparatus for the production line as seen in FIG. 1. A plastic forming production line as shown in FIG. 1 is generally denoted by the numeral 10, and incorporates the use of a first female mold and a second male mold, 12 and 14, respectively. The female and male mold sections 12 and 14 are shown in contact with mold heaters 16 which utilize propane from propane tank 17 in order to heat the mold sections. After the molds 12 and 14 are heated, a particulate plastic material 18 is dropped from above and distributed from a hopper 20 via particulate distributor tubes 22 into the cavities of the molds 12 and 14. The plastic melts against the heated molds and forms a skin on the molds.

In the current embodiment, hopper 20 has a large supply of the particulate plastic material 18, which is preferably a powder, but may also be pellets, resin or any other type of dry particulate material. The powdered materials are distributed via distributor tubes 22 onto the top of the male and female molds 12 and 14. As the molds 12 and 14 have been preheated by heater 16 to a temperature above the melting temperature of the particulate material 18, once the powdered material is distributed through tubes 22 into the molds 12 and 14, the particulate material 18 is allowed to sit in the mold in order to melt against the heated mold to form the individual skins.

The preferred material for use in this application includes powdered polyurethane thermoplastic, available from Equistar Corporation in the United States, which is readily available throughout the continental United States. Needless to say, any particulate material which is a thermoplastic material that can be melted, would be suitable for this application. Therefore, the list of appropriate materials would include polyethylene, polypropylene, nylons, and all the other thermoplastic materials known to one of ordinary skill in the art. Once powder 18 is sitting in the molds 12 and 14, a skin forms of the melted and fused plastic, while the uppermost portion of powder 18 (as it sits in the mold) will remain in its particulate form, and must be dumped after the appropriate thickness of the skin has been achieved. In our preferred embodiments, the skin shall be manufactured to a thickness of between about 0.5 mm and about 5 mm.

Various applications will require various thicknesses of the skin. It has been found that the particulate material, when it is in powdered form, having a mesh size of slightly larger than talc powder, has a preferred residence time of approximately one minute per millimeter of thickness of skin. In other words, a full load of powdered material 18 is dumped into molds 12 and 14, after the molds have been heated to approximately between about 180° F. to 450° F., and for every minute that the powder remains in contact with the heated mold, the skin becomes one millimeter thicker. For instance, our preferred thickness for automotive applications is approximately 3 mm thick. Therefore, the powdered material is allowed to stay in contact with the heated mold for about three minutes. Of course, the form of the powder affects the length of residency time, as a more coarse powder would require a longer residence time in order to melt it against the mold to form a skin. For example, pelletized plastic material may require a residence time in the mold of from about 0.5 minutes to about 20 minutes to achieve a desired thickness.

The heaters 16 will be more fully described hereinbelow, as they are referred to by the inventors as a "heater glove" and the molds 12 and 14 are placed in close proximity to the heater glove. The heater glove will heat the molds, which are preferably made of aluminum or any suitable efficient heat conductive material, to an even temperature of around 180° F. to 450° F. In order to melt the polyurethane plastic which is purchased from Equistar Corporation, the molds are preferably heated to a temperature above the melting point of the plastic.

Therefore, the most preferred embodiment utilizes an all aluminum mold, which has been CNC ground into a appropriate configuration, and that mold is heated by flame to an optimum temperature of about 415° F., and is then contacted with a finely powdered polyurethane thermoplastic material, such as that purchased from Equistar Corporation.

Once the desired skin thickness has been achieved, the molds 12 and 14 need to be emptied to prevent further skin formation. In order to prevent further skin formation, the molds may be tipped over so that the excess powder can be tipped out of the mold and collected in a lower hopper 26, which is called the particulate return hopper 26. The molds of the present invention are tipped inward to empty the excess particulate material into the return hopper via turning axis 24. The mold heater is attached to a pivoting, tipping support 28, and rotates about turning axis 24 in order to dump the excess powder into the hopper 26. Once the tipping mechanism has been finished, the mold transfer rolling cart 30, to which all 15 of the above equipment has been mounted, includes wheels 32 for transporting the transfer cart from station to station. Once the operation has been finished at the first station, the mold transfer cart is then rolled to a second position underneath a similar second station, wherein the second station is similar to the first, but having a new particulate material generally a particulate foaming material.

At this time, reinforcements may be added to the mold prior to the distribution of foam through its distributor tubes into the molds. The foam powder distributor mechanism is preferably of a similar configuration to the surface powder distribution mechanism described hereinabove with reference to FIG. 1. Reinforcements suitable to be put into the mold may include nearly anything, but are preferably pieces of fiberglass cloth, Kevlar cloth, steel mesh, steel perforated sheets, or any other thing which may be porous to allow the foam to foam up, in and around, and encapsulate the reinforcement within the mold.

Figure 2:
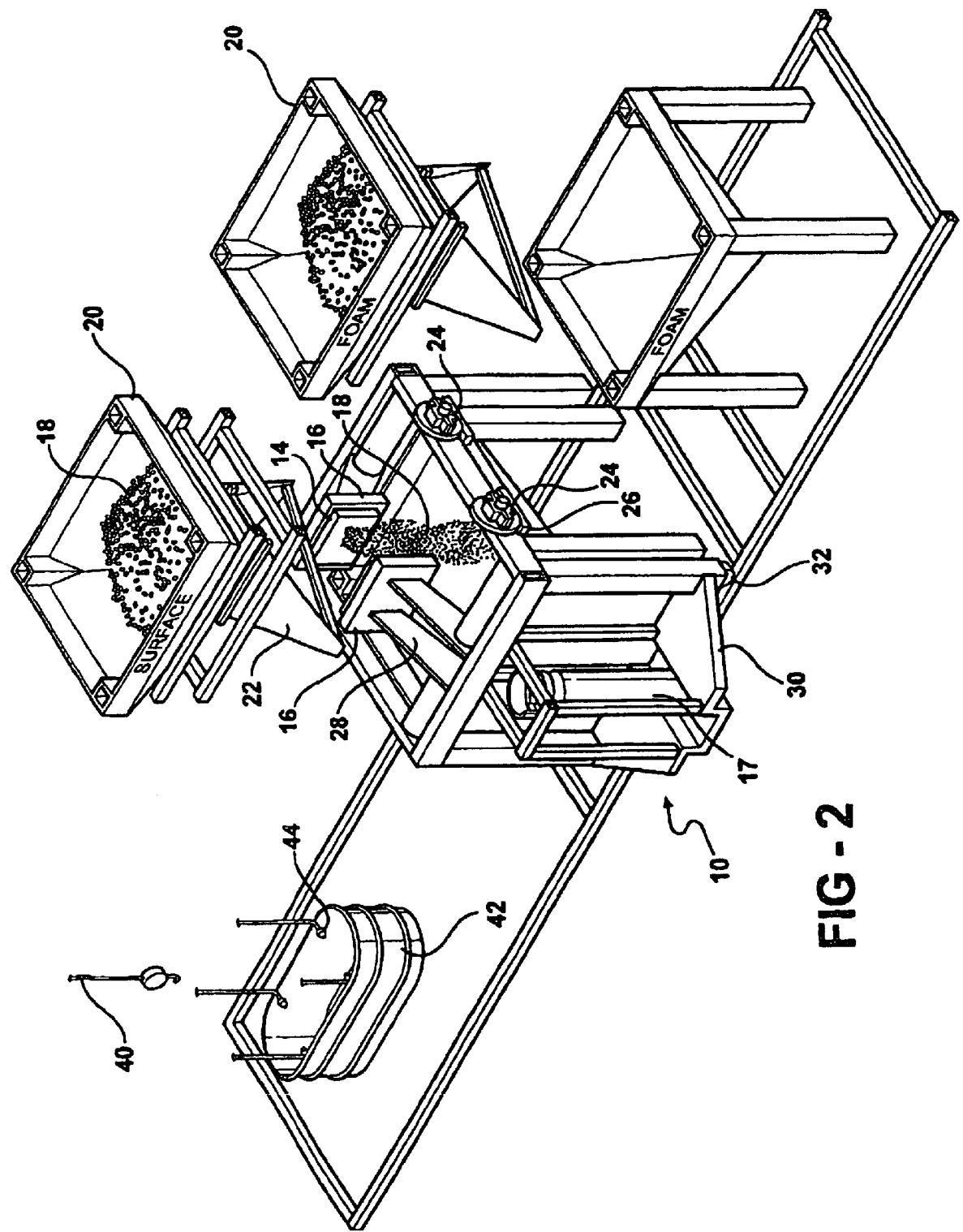
FIG. 2 shows the same apparatus of FIG. 1, but with the rolling cart in a secondary position under another particulate material distributor.

Looking now to FIG. 2, there is shown the tipping occurring at the foam station to remove the excess foam powder. This foam powder operation is a similar operation to that which occurs (but is not shown) at the surface powder station. Once the excess foam powder has been dumped from the molds, the two molds are held together and clamped to form a cavity into which the foam can expand into. The foam is a polyurethane material available from Equistar Corporation, and is sold under their proprietary materials group. Again, the excess foam material powder is tipped out of the molds into the return hopper, similar to the particulate return hopper 26 with regards to the surface transfer station, and the excess is vacuumed back upwards to the distributor hopper 20. If the perfect amount of foaming plastic can be put into the mold, then tipping out excess would not be required.

The two molds are then held together to allow the heat from the molds to activate the foamable polyurethane particulate material such that it foams up into the cavity created by the first and second molds 12 and 14, respectively. Any foamable material may be suitable for this application, and it may also be applied as a liquid in addition to the powdered or particulate foam material which is used in the preferred embodiment of the present invention.

Preferably a light clamping pressure is all that is required to hold the two molds together to maintain a minimum amount of flashing and to evenly distribute gaseous bubbles generated in the foaming procedure throughout, without delaminating the two skins from the foamed material. In the event that a liquid foamable material is to be used, the molds may be held in a horizontal orientation, such that the foamable material may be spread into the bottom mold, while a top mold can be maneuvered into position on top of the bottom mold, and allow the foam to expand into position. Generally, the foaming operation takes anywhere from about one-half minute to about twenty minutes for full expansion of the foam, depending on the foaming product which is utilized. Generally, the same plastic powder is used as the surface plastic, only it has been pre-mixed with a foaming or blowing agent. Such blowing agent is well known in the art, and can be mixed into the plastic powder without any undue experimentation. Furthermore, the foaming action is also dependent on the reinforcements which are included within the mold prior to the mold being held together. The reinforcements become encapsulated by the foam, and become and integral part of the foamed article, once the plastic has cooled and set into a solid material.

Figure 3:
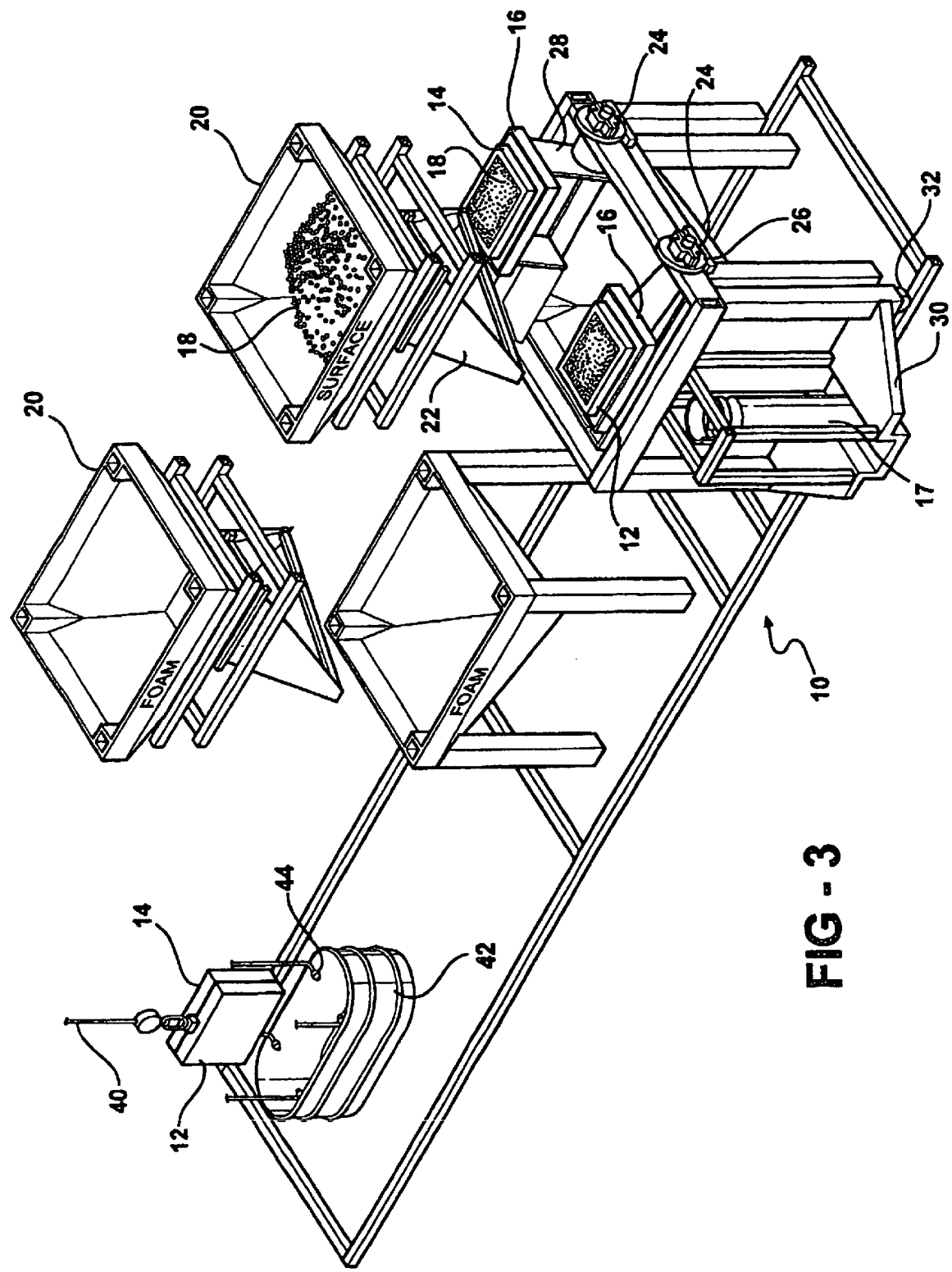
FIG. 3. is a perspective view of the mold removed from the cart and being lowered into the cooling mechanism in accordance with the present invention.

Looking now to FIG. 3, the mold is shown as having been hoisted up by a chain 40, and has been transferred to a location above a water-fed mold cooling station 42, which includes the spraying of water through nozzles 44 from the city water supply onto the outsides of the mold in order to cool the mold and the contents. As can be seen in FIG. 3, the nozzles 44 in the oval-shaped tub 42 are spaced so as to more evenly distribute the water against the surface of the mold. The mold is lowered into the oval-shaped cooling station, and the water is pressurized out of the nozzles against the outside of the mold, and the mold is cooled for a period of anywhere from about 5 minutes to about 90 minutes. Thereafter, the mold halves are opened and the foamed article is released. It must be realized, though, that any method of cooling is acceptable, including cool air jetting, placement into a refrigerator or placement into a cooling medium.

Figure 4:
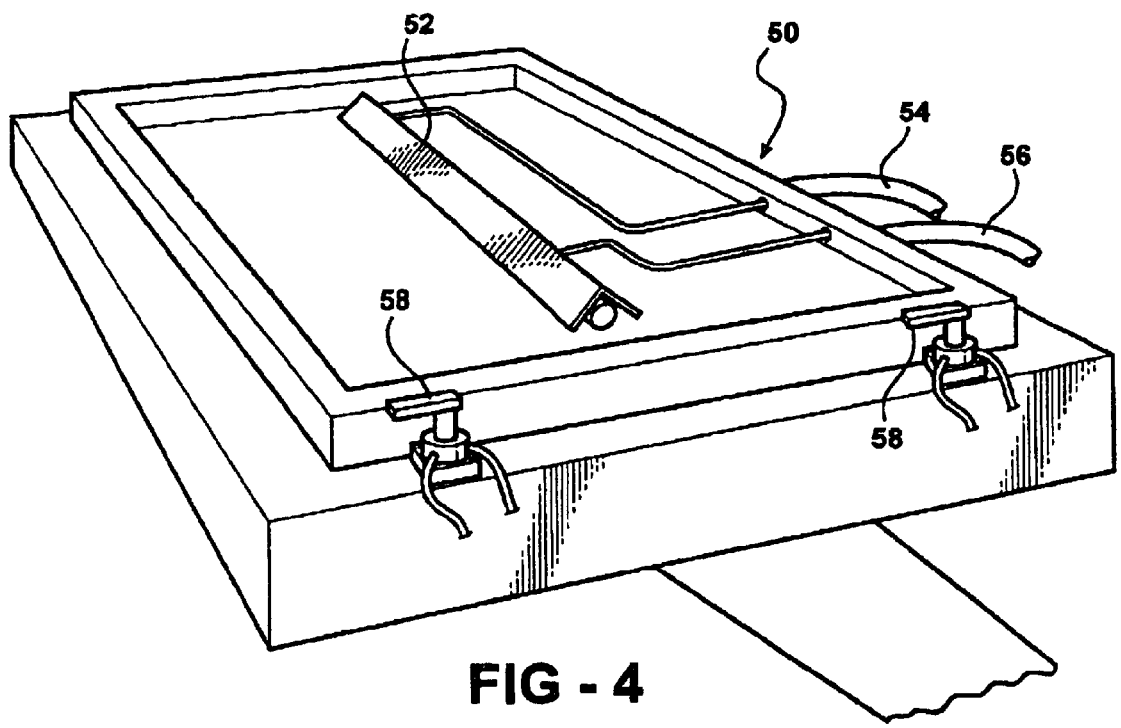
FIG. 4 is a side elevational view of a heating glove.

Looking next to FIG. 4, there is shown a photograph of the heating glove generally denoted by the numeral 50, described hereinabove with reference to FIGS. 1-3 for heating the molds. The heater glove 50 of FIG. 4 illustrates the heating baffle 52 which is helpful in maintaining a flame when the heater glove is being tipped back and forth. In order to keep heat on the mold while the powder is being tipped out of it, a flame-out-proof design was needed. Baffle 52 keeps the flame lit even during the tipping procedure. Heater glove 50 is shown with a baffle 52 and a distribution means 54, along with exhaust tubes 56 in order to remove the excess heated air. Clamps 58 are shown, but will be described below.

Figure 5:
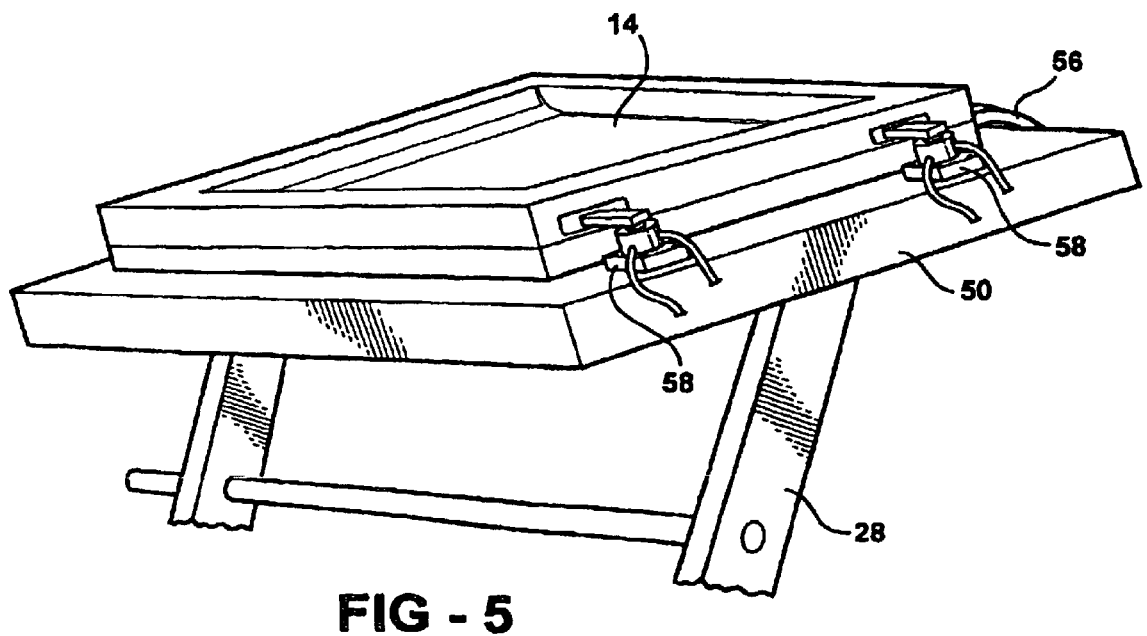
FIG. 5 is a side perspective view of the heating glove.

Once the heater glove 50 is covered with mold 14, as shown in FIG. 5, clamps 58 are shown holding the side of the mold against the heater glove box 50. As can be seen, the heater glove box 50 is mounted on an angled piece of steel 28 attached to an axis below. As the axis turns, any excess powder will be tipped out of mold 14. In FIG. 5, the mold 14 is shown without the powder therein, in order to show details of the mold, the axis, and its position.

Figure 6:
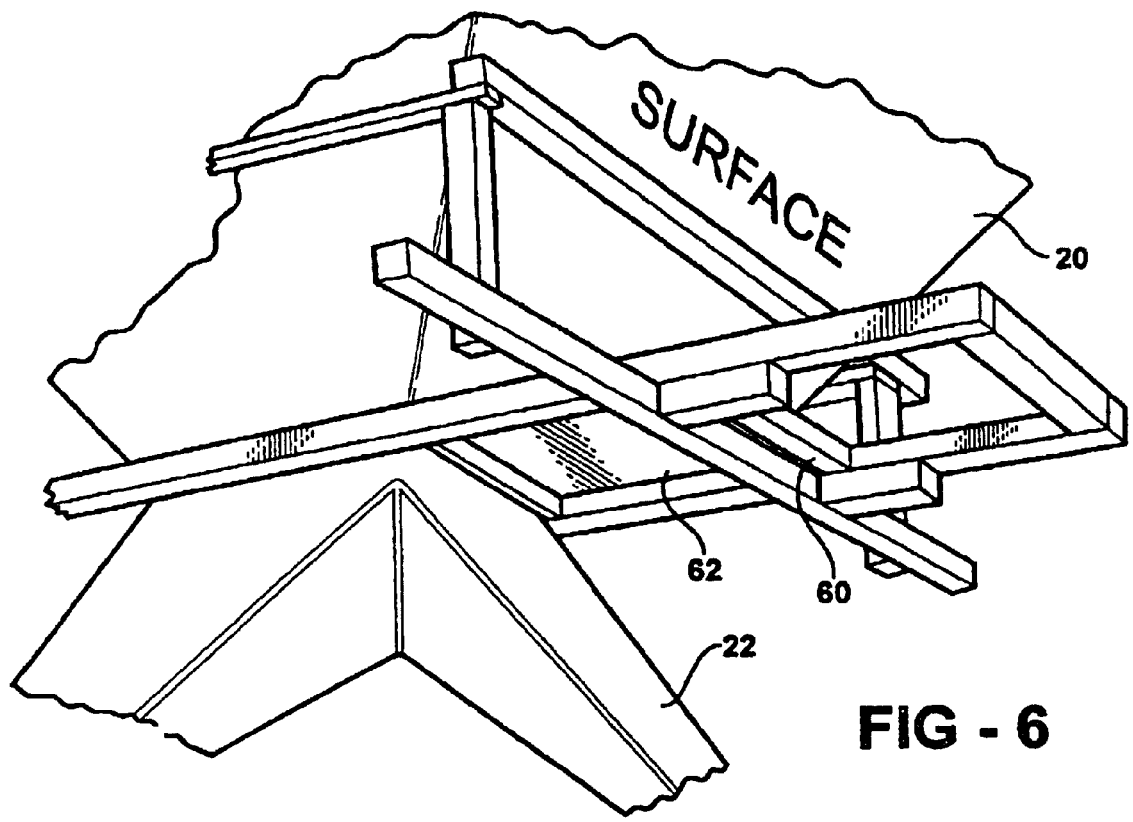
FIG. 6 is a bottom perspective view of the distributor arms and hopper of the surface powder station of the present invention.
Figure 7:
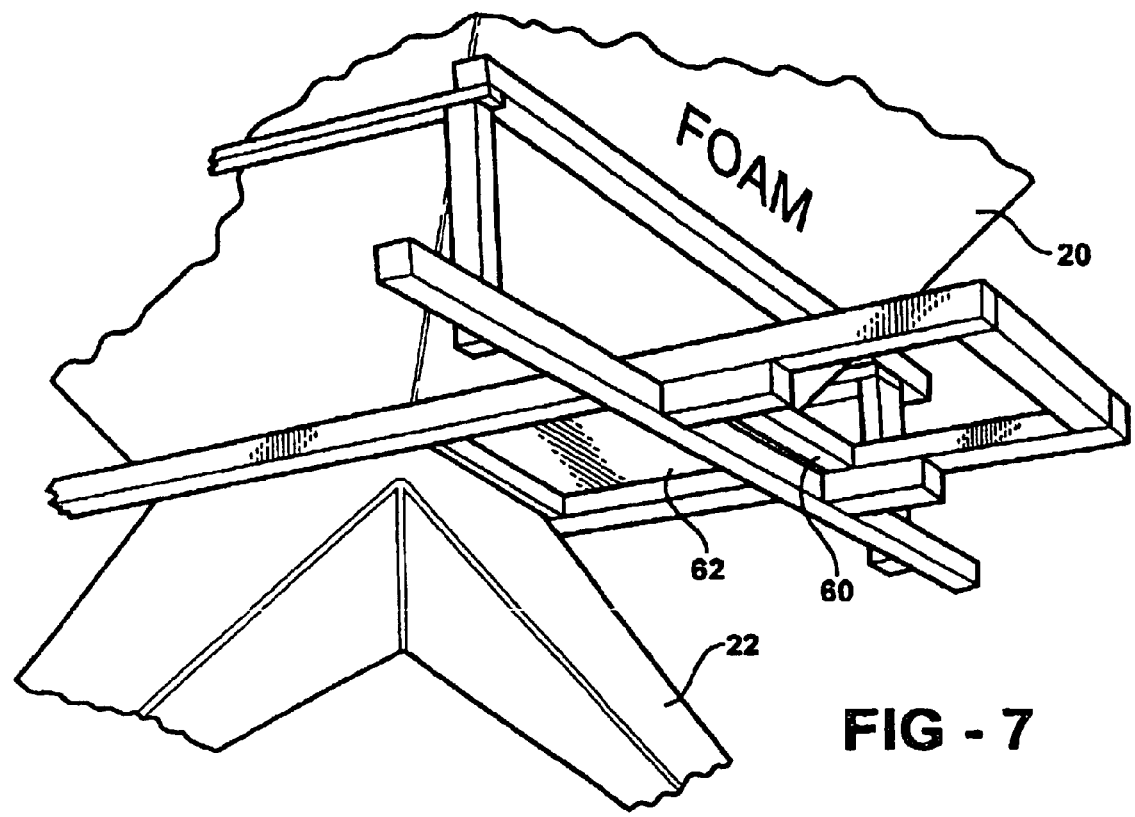
FIG. 7 is a bottom perspective view of the distributor arms, hopper and shut-off valve of the foam powder station.

FIGS. 6 and 7 show the bottom side of the hopper 20 as shown in FIGS. 1-3, and hopper 20 is shown with its distribution arms 22 extending downwardly therefrom. Shutoff valve 60 is shown in the open position, whereas if the flat portion 62 of the shutoff valve is shoved over the distributor tubes 22, the flow is cut off. However, FIGS. 6 and 7 illustrate the shutoff valve in the open position, such that material 18 from in the hopper 20 held above mold 14 will flow downwardly by gravity into the mold. Pre-measured amounts of powder are put into the hopper so that when there is a sufficient amount of powder and the mold, the hopper will most generally be empty.

Figure 8:
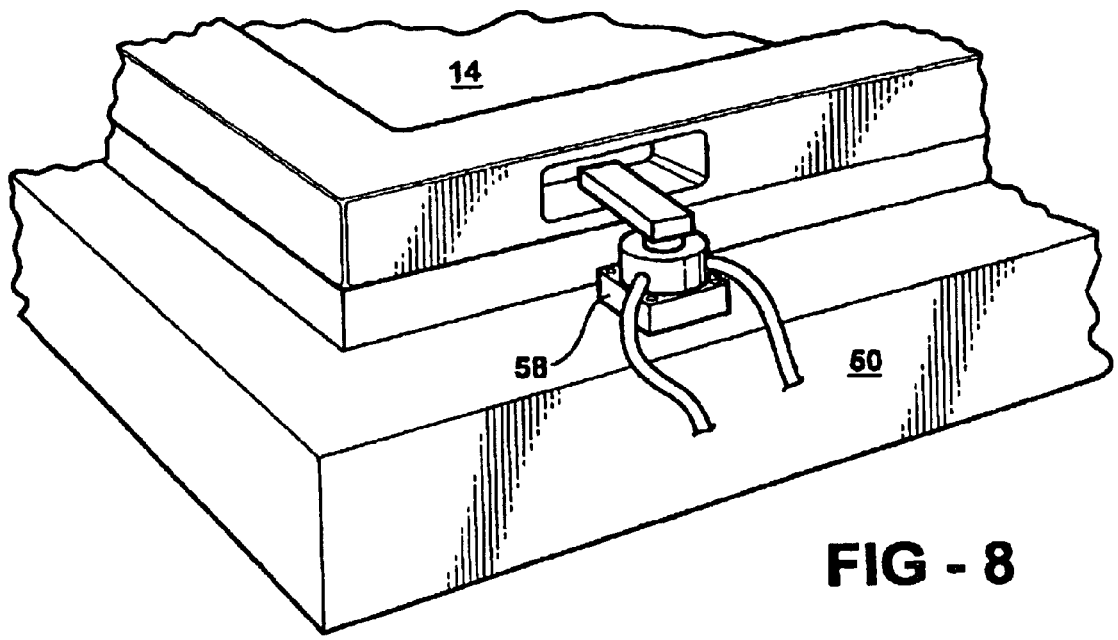
FIG. 8 is a perspective view of the mold/heater glove combination.
Figure 9:
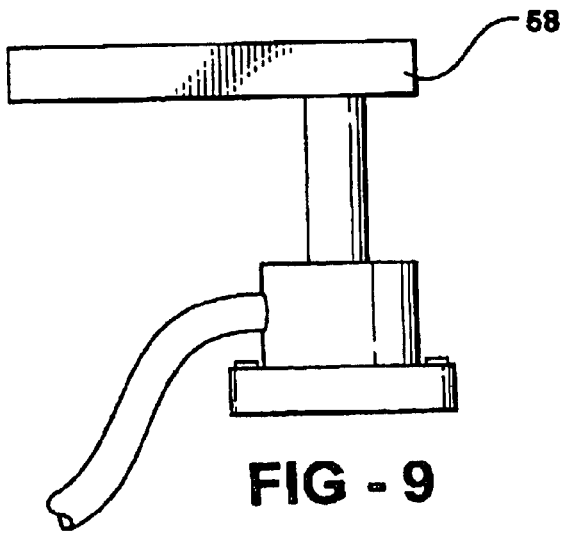
FIG. 9 is a side elevational view of a clamping mechanism.

Looking next to FIGS. 8 and 9, there is shown the preferred clamping arms 58 which hold the mold 14 to the heater box 50 below. In the preferred embodiment, the clamping arms 58 are hydraulically operated, or may be operated pneumatically for rapid response. FIG. 9 is a close-up of clamping arm 58, while FIG. 8 shows the clamping arm 58 in its working environment.

Figure 10:
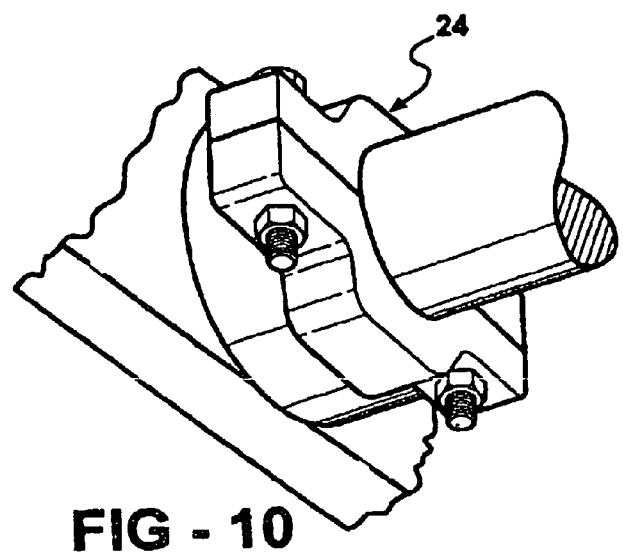
FIG. 10 is a perspective view of the tipping mechanism.

FIG. 10 shows the tipping mechanism 24, or trunion, and shows the temperature dial on the side of the heater glove box 50. The trunion design will be used to rotate about the axis in order to flip so that mold 14 tips excess powder backward into the center of the transfer station and into the reservoir hopper which is located below. The powdered material from the reservoir hopper may be vacuumed back up into the upper most hopper in order to recharge the surface and foam hoppers 20.

Looking now to FIG. 11 the water cooling station 42 of this production line includes a multitude of water nozzles 44 for even spraying of cool water onto the sides of the mold (not shown here) in order to cool it off. Once the mold has been lifted from the foam powder station, it is inserted between all of these nozzles from above and the nozzles are turned on for time periods from about 1 second to about 60 seconds, depending on how much steam is generated and the amount of steam which can be handled within the plant setting. After the water is sprayed from the nozzles, it is evacuated back into a reservoir system for further use. The water is recycled many times, and cools the mold prior to the end result coming out of the mold.

FIG. 12 illustrates a sample of a resulting plastic molded article known as a test plaque, with the paper-thin flashing extending around the perimeter of the mold where the seam has occurred, and it also shows the flat surface which can be achieved. The paper-thin flashing has been achieved due to the clamping arms which hold the mold together while the foaming is taking place. The clamping arms exert a very light pressure, on the order of from about 10 mmHg to about 10,000 mmHg, and this yields a superior product.

As shown in FIG. 13, the light clamping was not utilized during the process and consequently a heavier and larger flashing portion exuded from the mold seams when only gravity was used to hold the top mold against the bottom mold. Although this embodiment works equally as well, it is more economical to use less polyurethane foam powder if one clamps the molds together with a light pressure.

The resulting article may be any article including auto parts, boat parts, houising components or anything that may be made of plastic, all to he made by the preferred embodiment of the process described herein. Such articles include two skins, one on one side and one on the other of the article, each being any desired thickness although most articles preferably are approximately three millimeters in thickness. A one-inch thick foamed center is between the two skins, and the article may or may not be made with reinforcements therein. In the present example of a test plaque, a reinforcement of a fiberglass cloth was placed in the center of the plaque (the resulting plastic molded article) in order to impart strength. The previous patent applications which were filed for 3 DM Technologies, Inc., have incorporated descriptions of the possible reinforcements which may be utilized, and those applications are incorporated herein by reference.

Therefore, the present invention has been described in enough detail to enable one of ordinary skill in the art to reproduce the method and apparatus for forming plastic molded articles in a production line setting without undue experimentation. All of the objects and advantages listed first in this patent application are met and/or exceeded.

The foregoing description of a preferred embodiment of the invention has been presented for purposes of illustration and description. It is not intended to be to be exhaustive or to limit the invention to the precise form disclosed. Obvious modifications or variations are possible in light of the above teachings with regards to the specific embodiments. The embodiment was chosen and described in order to best illustrate the principles of the invention and its practical applications to thereby enable one of ordinary skill in the art to best utilize the invention in various embodiments and with various modifications as are suited to the particular use contemplated. It is intended that the scope of the invention be defined by the claims which are appended hereto.

What is claimed is:

1. A plastic forming apparatus for making plastics from at least two different particulate plastic materials, comprising:

at least two complementary open bare surface molds, each mold being mounted on a rolling cart, where said molds are capable of being moved along a trunion track and capable of being heated;

said molds having at least one open bare surface with a sealing edge for ultimately mating with the other open mold, said open bare surface being disposed for receiving the particulate plastic materials;

at least one hopper for dumping a first particulate plastic into each of the open molds individually, said hopper having at least one distributor arm with a downwardly facing distributor tube including louvers for opening and closing the louvers to distribute the particulate material into each of the individual open molds, said hopper being capable of being recharged with surplus particulate plastic material after the molds are used;

a supply of heat for separately heating the complementary molds;

a second hopper for dumping a second particulate plastic into at least one of the molds, said second hopper also having a distributor arm with a downwardly facing distributor tube including louvers for selectively opening and closing the louvers to distribute the particulate material into the at least one mold, said hopper being capable of being recharged with surplus particulate plastic material after the molds are used;

a means for rotating the molds to remove excess particulate plastic material and a means for bringing the two open molds together to form a cavity therebetween, a cooling station for cooling the heated molds;

a track for rolling the two carts from under the first hopper to a position under the second hopper and then into the cooling station; and a means for moving the closed cavity molds into said cooling station.

2. The apparatus of claim 1, wherein the at least two complementary open molds are made of aluminum and further comprise heating plenums attached to the back of the molds to heat the molds.

3. The apparatus of claim 1, wherein the heating plenums include a propane fired heating unit capable of being tipped over after the particulate material has melted onto the mold, in order to discharge any remaining unmelted particulate plastic.

4. The apparatus of claim 1, wherein the at least two complementary open molds are designed to be held apart at a predetermined distance to allow for a resulting article having a sandwich configuration with a foamed center.

5. The apparatus of claim 1, wherein the molds rotate on a horizontal axis on the rolling cart, such that after the desired melted skin has been formed on the mold, the mold can be tipped over to discharge excess plastic before the next step.

6. The apparatus of claim 1, further comprising dump trays under each of the hoppers for receiving the discharge excess plastic.

7. The apparatus of claim 1, further comprising a vacuum mechanism for transferring the excess particulate plastic contained in the dump trays back up into the hopper for further distribution into subsequent molds.

8. The apparatus of claim 1, further comprising water spraying nozzles in the cooling station for cooling the molds after the desired article has been formed.

* * * * *